Figure 1:
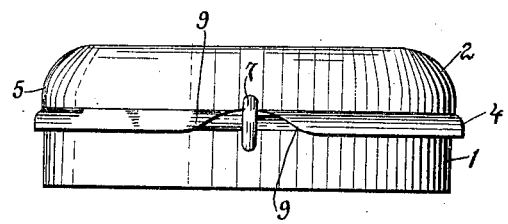

No. 856,280. PATENTED JUNE 11, 1907.
F. H. G. MORSE.
RECEPTACLE OPENER.
APPLICATION FILED FEB. 1, 1906.

Witnesses
V. N. Hopping
S. Herzog

Frank H. G. Morse
Inventor

By Attorney

UNITED STATES PATENT OFFICE.

FRANK H. G. MORSE, OF MALDEN, MASSACHUSETTS.

RECEPTACLE-OPENER.

No. 856,280.

Specification of Letters Patent.

Patented June 11, 1907.

Application filed February 1, 1906. Serial No. 299,056.

*To all whom it may concern:*

Be it known that I, FRANK H. G. MORSE, a citizen of the United States, and a resident of Malden, Massachusetts, have invented new and useful Improvements in Receptacle-Openers, of which the following is a specification.

My invention relates to means for opening boxes and receptacles, especially where such boxes or receptacles have tightly sealed or closed covers.

The invention consists in providing a box with a reversed bead and a cover with a bead or lip around its outer edge whereby the boxes may be opened by alternately pressing the side of the box and the cover so as to compress the two alternately along diameters at right angles to each other.

The invention also consists in providing a box with a bead and a cover with a bead reversed to that of the box and adapted to be located opposite the bead of the box and a substantially circular clip located in the beads of the box and the cover.

The invention consists in further providing the cover with a notch having sinuous edges which notch is adapted to receive an enlargement of the clip, whereby the clip may be pushed around and pressed against the inner surface of the beading of the box and along the edge of the cover.

The invention consists in other features described in the following specification, disclosed in the drawing and claimed in the claims.

Figure 2:
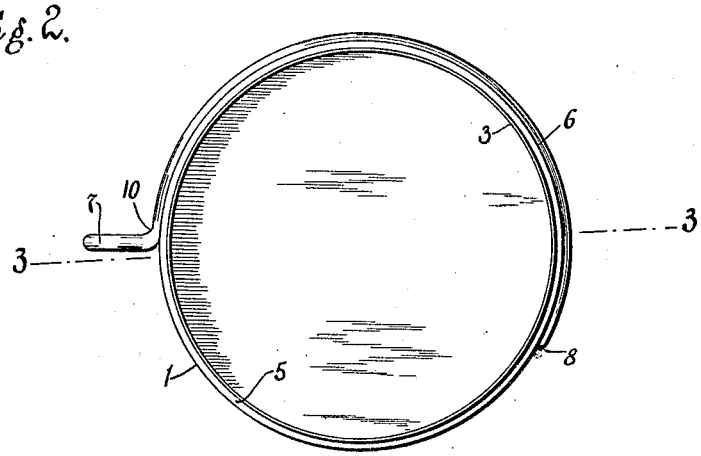
Figure 3:
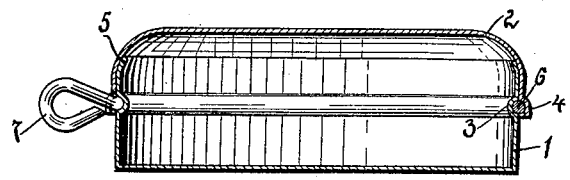
Figure 4:
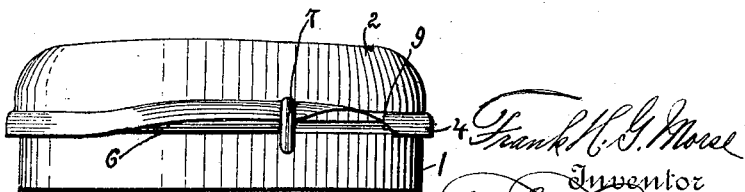

Referring to the drawing Figure 1 illustrates a front view of the receptacle containing my invention. Fig. 2 illustrates a top view of the receptacle having the cover removed. Fig. 3 illustrates a sectional view of the receptacle taken along the diameter 3, 3 indicated in Fig. 2. Fig. 4 illustrates the application of my invention.

1, Fig. 1, is the body of the box. 2 is the cover of the box. The body of the box is provided with a bead or lip 3 which extends all the way round the box. The cover 2 is also provided with a bead 4 which causes the edge 5 of the flange of the box to extend outward from the cover and also from the body 1 of the box. The head 4 of the cover is so located that when the cover is placed upon the box the upper edge of the bead of the cover will register with the upper edge of the bead on the box and the beading of the two will be located opposite to each other. In the bead of the cover and the body of the box is located a wire 6 bent into an arc. The wire 6 extends more than half way around the box and may extend all the way around the box. The wire 6 has a considerable amount of stiffness which causes it to securely maintain its position in the reversed bead. One end of the wire is enlarged or bent to form a loop 7 which enables one to seize hold and operate the wire to slide the wire 6 around the box and in the beading of the box and the cover when the cover is placed on the box. The other end 8 of the wire may be rounded.

The end 7 extends outward through a notch 8 in the cover of the box. The notch is provided with sinuous sides 9 which direct the neck 10 of the wire clip under the edge of the cover and lifts it upward as the neck moves along the inclined surface of the side of the notch and the edge of the flange after it leaves the notch.

When the box is opened by pressing the finger against the loop or enlarged portion 7 of the wire 6 in the direction of the body of the wire, it pushes the flange of the cover and the cover itself upward as it passes under the edge of the cover. The wire is pressed inward and against the lower side or shoulder of the beading in the body of the box which causes it to maintain its position. After the cover has been raised a short distance by this process and the seal between the cover of the box and the body of the box is broken or the cover is thus loosened from the box, the cover can then be easily taken off from the box. When the cover is again placed upon the box, the notch is placed over the loop or enlarged portion 7 of the wire and the cover may be again opened as before.

If it is desired the box may be opened by alternately pressing the body of the box and the cover of the box along diameters at right angles to each other. When the body of the box is pressed at opposite portions of its side the beading of the box affords sufficient stiffness to cause the portions of the side located at ends of the diameter of the box which is at right angles to the diameter along which the portions of the box are pressed to extend outward and to swing downward about the lower edge of the box, the said portions describing small angles in their movement about the lower edges of the body of the box. This causes the body of the box to slip downward a short distance with respect to the cover.

When the portions of the cover of the box are compressed, the bead of the cover is sufficiently stiff to cause the portion located in proximity to the portions of the box that were formerly pressed to extend outward and to describe a small angle and raise slightly the edge of the cover of the box. When the body of the box is again pressed as before the portions located at the ends of the diameter at right angles to the diameter along which the body of the box is compressed, the body of the box is again moved downward another short distance. As these processes are repeated, the cover is gradually lifted step by step with respect to the body of the box.

What I claim and desire to secure by Letters Patent is as follows:

1. In a receptacle the combination of the body of the receptacle and the cover of the receptacle, the said body of the receptacle having a beading, the said cover having a flange adapted to extend down and around the outside of the receptacle, the said flange having a beading located along its edge and a slidable means located within the said beading and having a portion extending outward from the beading and adapted to press against the edge of the cover, the edge of the cover having an inclined portion.

2. In a receptacle the combination of the body of the receptacle and the cover of the receptacle, the said body of the receptacle having a beading, the said cover having a flange adapted to extend down and around the outside of the receptacle, the said flange having a beading located along its edge and a means located in the said beading and secured to the body of the receptacle and adapted to slide along the beading and thereby to lift the cover from the receptacle the edge of the cover being inclined.

3. In a receptacle the combination of the body of the receptacle and the cover of the receptacle, the said body of the receptacle having a beading, the said cover having a beading located along its edge opposite the beading located in the body of the receptacle, a wire located in the said beading of the body of the box and the cover of the box and adapted to clasp the body of the receptacle and having a right angular portion extending outward under the edge of the cover and adapted to slide around the body of the receptacle, the said edge having an inclined portion located in the path of the said right angular portion of the said wire whereby the cover may be removed from the body of the receptacle.

4. In a receptacle the combination of the body of the receptacle and the cover of the receptacle, the said body of the receptacle having a beading, the said cover having an inclined portion and a wire clamped to the body of the receptacle and located in the said beading, the said wire having an outwardly extending portion and adapted to press upward on the edge of the cover and against the wall of the said beading as the said wire is slid around the body of the receptacle and wedge the cover from the body of the box.

5. In a receptacle the combination of the body of the receptacle and the cover of the receptacle, the said body of the receptacle having a beading, the said cover having a flange adapted to extend down and around the outside of the receptacle, the said flange having a beading located along its edge and opposite the beading located in the body of the receptacle, a notch located in the flange of the cover having slanting sides and a means slidably located in said opposite beads and having a projection lying in said notch, said means being adapted to slide along the edge of the said notch and edge of the said flange and in the beading to lift the cover from the receptacle.

6. In a receptacle the combination of the body of the receptacle and the cover of the receptacle, the said body of the receptacle having a beading, the said cover having a flange adapted to extend down and around the outside of the receptacle, the said flange having a beading located along its edge and opposite the beading in the body of the receptacle, a notch located in the flange of the cover of the receptacle and having slanting curvilinear sides, a wire located in said opposite beads having an enlarged end located in and adapted to slide along the sides of the notch and under and along the edge of the cover.

In testimony whereof, I have signed my name to this specification, in the presence of two subscribing witnesses.

FRANK H. G. MORSE.

Witnesses:
FRANK P. THAYER,
WALTER C. PESSELS.